(12) United States Patent
Lang

(10) Patent No.: US 10,000,659 B2
(45) Date of Patent: Jun. 19, 2018

(54) INSULATING LAYER-FORMING COMPOSITION AND USE THEREOF

(71) Applicant: HILTI AKTIENGESELLSCHAFT, Schaan (LI)

(72) Inventor: Martin Lang, Planegg (DE)

(73) Assignee: HILTI AKTIENGESELLSCHAFT, Schaan (LI)

( * ) Notice: Subject to any disclaimer, the term of this patent is extended or adjusted under 35 U.S.C. 154(b) by 0 days. days.

(21) Appl. No.: 14/739,454

(22) Filed: Jun. 15, 2015

(65) Prior Publication Data
US 2015/0275031 A1 Oct. 1, 2015

Related U.S. Application Data

(63) Continuation of application No. PCT/EP2013/076151, filed on Dec. 11, 2013.

(30) Foreign Application Priority Data

Dec. 18, 2012 (DE) .......................... 10 2012 223 515

(51) Int. Cl.
| | | |
|---|---|---|
| C09D 163/00 | (2006.01) | |
| C09D 5/18 | (2006.01) | |
| C08G 59/40 | (2006.01) | |
| C08G 59/66 | (2006.01) | |
| C09K 21/14 | (2006.01) | |
| C08K 5/00 | (2006.01) | |
| C08K 5/3492 | (2006.01) | |

(52) U.S. Cl.
CPC ........ *C09D 163/00* (2013.01); *C08G 59/4064* (2013.01); *C08G 59/66* (2013.01); *C08K 3/016* (2018.01); *C09D 5/185* (2013.01); *C09K 21/14* (2013.01); *C08K 5/0066* (2013.01); *C08K 5/34922* (2013.01)

(58) Field of Classification Search
CPC .............................. C08L 63/00; C09D 163/00
See application file for complete search history.

(56) References Cited

U.S. PATENT DOCUMENTS

| | | | |
|---|---|---|---|
| 2003/0211796 A1* | 11/2003 | Jahns | C04B 20/1033 442/136 |
| 2004/0147184 A1* | 7/2004 | Taylor, Jr. | C09K 21/14 442/20 |
| 2004/0224163 A1* | 11/2004 | Tobita | C08G 59/28 428/413 |
| 2006/0041042 A1* | 2/2006 | Thewes | C08K 5/0066 524/115 |
| 2010/0193725 A1* | 8/2010 | Rousse | C08G 59/5086 252/62 |
| 2010/0218932 A1* | 9/2010 | Fischer | B32B 5/18 165/185 |
| 2011/0089549 A1* | 4/2011 | Zenbutsu | H01L 21/565 257/676 |
| 2011/0297317 A1* | 12/2011 | Lutz | C09J 163/00 156/330 |
| 2012/0229992 A1* | 9/2012 | Eichner | B29C 44/06 361/748 |

FOREIGN PATENT DOCUMENTS

| | | |
|---|---|---|
| RU | 2214434 C2 | 10/2003 |
| RU | 2352601 C2 | 4/2009 |
| WO | 02/070622 | 9/2002 |
| WO | WO 2012/082224 A1 | 6/2012 |

OTHER PUBLICATIONS

International Search Report in PCT/EP2013/076151 dated Apr. 25, 2014.

* cited by examiner

*Primary Examiner* — Megan McCulley
(74) *Attorney, Agent, or Firm* — Grüneberg and Myers PLLC

(57) ABSTRACT

Described is an insulating layer-forming composition, which contains a binder based on epoxy-thiol. The inventive composition, its rate of expansion ratio is relatively high, allows coatings having the layer thickness, required for the respective period of fire resistance, to be applied in a simple and fast manner, while at the same time the layer thickness is reduced to a minimum and yet a high insulating effect can be achieved. The composition of the invention is particularly suitable for fire protection, in particular as a coating of metallic and non-metallic substrates, such as steel components, like columns, beams, trusses, in order to increase the period of fire resistance.

23 Claims, No Drawings

INSULATING LAYER-FORMING COMPOSITION AND USE THEREOF

RELATED APPLICATIONS

This application claims priority to, and is a continuation of, PCT Application No. PCT/EP2013/076151 having an International filing date of Dec. 11, 2013, which is incorporated herein by reference, and which claims priority to German Patent Application No. 10 2012 223 515.9, having a filing date of Dec. 18, 2012, which is also incorporated herein by reference in its entirety.

SUMMARY OF THE TECHNOLOGY

The present invention relates to an insulating layer-forming composition, in particular, a composition that has intumescent properties and that contains a binder, based on epoxy-thiol, and the use of such an insulating layer-forming composition for fire retardation, in particular, for coatings of components, such as columns, beams, or trusses, in order to increase the period of fire resistance.

BACKGROUND OF THE INVENTION

Insulating layer-forming compositions, also referred to as intumescent compositions, are usually applied on the surface of components, in order to form coatings for the purpose of protecting these components from fire or from the effect of a high degree of heat as a result of a fire. In the meantime steel structures have become an integral part of modern architecture, even if they have a distinct disadvantage compared to reinforced concrete construction. At temperatures exceeding approximately 500 deg. C., the load bearing capacity of steel drops by 50%. That is, the steel loses its stability and load bearing capacity. This temperature can be reached, as a function of the fire load, for example, during direct exposure to fire (approximately 1,000 deg. C.), after about 5 to 10 minutes, a situation that often leads to a loss in the load bearing capacity of the structure. At the present time the goal of fire retardation, in particular, the fire retardation of steel, is to delay as long as possible the time it takes for a steel structure to lose its load bearing capacity in the event of a fire for the purpose of saving human lives and valuable assets.

For this purpose the building regulations in many countries require commensurate periods of fire resistance for certain structures made of steel. These periods are defined by means of the so-called F classes, such as F 30, F 60, F 90 (fire resistance classes in compliance with DIN 4102-2) or the American classes in compliance with ASTM etc. In this respect F 30 according to DIN 4102-2 means, for example, that in the event of a fire the load bearing steel structure has to withstand the fire for at least 30 minutes under standard conditions. This requirement is usually met by delaying the rate of the temperature rise of the steel, for example, by coating the steel structure with intumescent coatings. In this case it involves paints with constituents that foam to form a solid microporous carbon foam in the event of a fire. At the same time a fine pored and thick foam layer, the so-called ash crust is formed. This foam layer has high heat insulating properties, as a function of the composition, and, as a result, delays the temperature rise of the component, so that the critical temperature of approximately 500 deg. C. is reached no later than after 30, 60, 90, 120 minutes or up to 240 minutes. The crucial feature for the achievable fire resistance is the applied layer thickness of the coating or more specifically the ash crust that develops from said coating that is applied. Closed profiles, such as pipes, with comparable solidity, need about twice the amount compared to open profiles, such as beams with a double T profile. In order to satisfy the required periods of fire resistance, the coatings have to have a certain thickness and must have the ability to form, when subject to the effect of heat, an ash crust that is as voluminous as possible; and, as a result, this ash crust has good insulating properties and stays mechanically stable over the period of time that it is exposed to a fire.

To this end there are a number of systems in the state of the art. In essence a distinction is made between 100% systems and systems that are based on a solvent or water. In the solvent based or water based systems binders, usually resins, are applied on the component as a solution, dispersion or an emulsion. These solvent based or water based systems can be designed as a single component system or as a multi component system. After the system has been applied, the solvent or water evaporates and leaves behind a film that dries with time. In this case a distinction may also be made between such systems, in which essentially the coating no longer changes during the drying phase, and such systems, in which, following evaporation, the binder is primarily cured by oxidation reactions and polymerization reactions, a process that is induced, for example, by the atmospheric oxygen. The 100% systems contain the constituents of the binder without solvents or water. Said 100% systems are applied on the component in such a way that the "drying" of the coating takes place only by the reaction of the binder constituents with each other.

The solvent based or water based systems have the disadvantage that the drying times, also called the curing times, are long and, in addition, several layers have to be applied, thus necessitating several working steps, to achieve the necessary layer thickness. Since each individual layer has to be suitably dried before the next layer is applied, the result is, on the one hand, a considerable amount of labor in terms of time and correspondingly high costs and a delay in the completion of the building, because depending on climatic conditions it may take several days before the required layer thickness has been applied. Another drawback is that there is the tendency for coatings that exhibit the required layer thickness to form cracks or to flake off during the drying phase or when subject to the effect of heat, so that in the worst case the substrate is partially exposed, in particular, in systems, in which the binder does not reharden after evaporation of the solvent or the water.

In order to circumvent this drawback, two component systems or multi component systems based on epoxy/amine have been developed that more or less make do without any solvents, so that the curing takes place much faster and, in addition, thicker layers can be applied in a single working step, so that it is possible to build up the required layer thickness much faster. However, these two component systems or multi component systems have the drawback that the binder forms a very stable and rigid polymer matrix, often with a high softening range, a phenomenon that hinders the formation of foam by the foaming agent. Therefore, thick layers have to be applied in order to generate a sufficient foam thickness for the insulation. This in turn is disadvantageous because a lot of material is required. In order for these systems to be applied, processing temperatures of up to +70 deg. C. are often required, a feature that makes the use of these systems labor intensive and expensive to install. Furthermore, some of the binder components that are used are toxic or critical in some other way (for example, irritant, caustic), such as, for example, the amines or amine mixtures that are used in the epoxy/amine systems.

In the field of coatings it is known from DE 4141858 A1 to use bisphenol A diglycidyl ethers, which are extended with dimercapto compounds or mercapto-carboxylic acids and bisphenol A, as a binder that is cured with amines. As a result, it is possible to formulate coatings with a high filler content. However, in this case, too, critical compounds are used. WO 2012/082224 A1, for example, describes a composition that comprises at least one epoxy compound, at least one polythiol compound as a curing agent and at least one catalyst. The coatings, which are obtained, among other things, in this way, exhibit a good resistance to solvents and have a hard surface. However, a fire retardant coating on this basis, that contains fire retardant additives, is not known. Furthermore, neither the maximum amount of the fire retardant additives in this fire retardant coating nor the behavior of the coating upon exposure to heat is known.

BRIEF DESCRIPTION OF SEVERAL VIEWS OF THE DRAWINGS

[Not Applicable]

SUMMARY OF THE INVENTION

In one embodiment, the present insulating layer-forming composition comprises a first constituent containing at least one epoxy resin, a second constituent containing at least one thio compound as a curing agent, and a third constituent containing an intumescent additive.

The layer-forming composition can be used as a coating. For example, it could be a coating for the coating of steel construction elements. It could also be used as a coating for metallic and/or non-metallic substrates. As another example, it can be used as a fire retardant layer.

A cured object can be obtained by curing an insulating layer-forming composition.

DETAILED DESCRIPTION OF THE INVENTION

Therefore, the object of the present invention is to provide an insulating layer-forming composition for a coating system of the type mentioned in the introductory part, where in this case the insulating layer-forming composition avoids the aforementioned disadvantages and is, in particular, neither a solvent based nor water based system. Furthermore, the insulating layer-forming composition is fast curing, is easy to apply owing to a suitably adapted viscosity and requires only a small layer thickness owing to the high intumescence, i.e. the formation of an effective ash crust layer.

This object is achieved by means of the composition according to patent claim 1. Preferred embodiments are disclosed in the dependent claims.

Based on the above, the invention is an insulating layer-forming composition comprising a constituent A, which contains at least one epoxy resin; a constituent B, which contains at least one thio compound as a curing agent; and a constituent C, which contains an intumescent additive.

Furthermore, the composition may also contain a catalyst for the reaction between the epoxy resin and the thio compound, so that at low temperatures, such as room temperature, the composition becomes sufficiently fast processable and curable.

The composition according to the invention allows the coatings comprising a layer thickness that is required for the respective period of fire resistance to be applied in a simple and fast manner. The advantages achieved by means of the invention are essentially to be seen in that the curing times, which are inherently slow in solvent based or water based systems, could be significantly decreased, a feature that significantly reduces the amount of work in terms of time. Due to the low viscosity of the composition in the area of application, said viscosity being adjusted by means of suitable thickener systems, it is possible, in contrast to epoxy/amine systems, to apply the composition without heating the composition, for example, by the popular airless spray method.

Another advantage lies in the fact that it is possible, for the most part, to dispense with such compounds, as, for example, critical amine compounds, that may present a risk to health and have to be specially labeled.

Owing to the softening range of the polymer matrix that is lower than that of the epoxy/amine based systems, the intumescence is relatively high with respect to the expansion rate, so that even in the case of thin layers it is still possible to achieve a high insulating effect. The potentially high degree of filling of the composition with fire retardant additives also contributes to this insulating effect. This potentially high degree of filling of the composition with fire retardant additives can also be achieved, among other things, by the fact that the composition can be formulated as a two component system or as a multi component system. As a result, the cost of materials declines, a feature that has a positive impact on the cost of materials, especially when said system is applied over a large area. This cost cutting is achieved, in particular, through the use of a reactive system that does not physically dry and, therefore, does not suffer from a loss in volume due to the drying off of the solvents or the water in water based systems, but rather cures nucleophilically. Thus, in a classical system a solvent content of about 25% is typical. This means that of a 10 mm layer only 7.5 mm remain as the actual protective layer on the substrate to be protected. In the case of the composition according to the invention more than 96% of the coating remain on the substrate to be protected. Furthermore, the relative stability of the ash crust is very high due to the advantageous structure of the foam that is formed in the event of a fire.

Compared to solvent based or water based systems, when they are applied without a primer, the compositions according to the invention show excellent adhesion to various metallic and non-metallic substrates, as well as an excellent cohesion and impact resistance.

For a better understanding of the invention, the following explanations of the terminology used herein are considered to be useful. In the context of the invention:

"multifunctional" means that the respective compound has more than one functional group per molecule; consequently in the context of epoxy compounds multifunctional means that these epoxy compounds have more than one epoxy group per molecule, and in relation to thiol functionalized compounds multifunctional means that these thiol functionalized compounds have at least two thiol groups per molecule; the total number of the respective functional groups is the functionality of the corresponding compound;

"skeleton" means the epoxy resin or the thiol functionalized compound of the respective other part of the molecule, to which the functional epoxy or thiol group may be attached;

"chemical intumescent" means the formation of a voluminous insulating layer of ash by means of matched compounds that react with each other when exposed to heat;

"physical intumescence" means the formation of a voluminous insulating layer due to the swelling of a compound that when exposed to heat releases gases even though no chemical reaction has taken place between two compounds, as a result of which the volume of the compound increases by a multiple of the original volume;

"insulating layer-forming" means that in the event of a fire a solid microporous carbon foam is formed so that the fine pored and thick foam layer that is formed (the so-called ash crust) insulates, depending on the composition, a substrate against heat;

a "carbon source" is an organic compound that leaves a carbon skeleton due to incomplete combustion and does not burn completely to form carbon dioxide and water (carbonification); these compounds are referred to as "carbon skeleton formers";

an "acid former" is a compound that when exposed to heat, i.e., above about 150 deg. C., for example, by decomposition, forms a non-volatile acid and, in so doing, acts as a catalyst for the carbonification; in addition, said acid former can contribute to lowering the viscosity of the melt of the binder; hence, the term is used interchangeably with the term "dehydrogenation catalyst";

a "blowing agent" is a compound that decomposes at an elevated temperature while simultaneously developing inert, i.e., non-combustible gases and expands (intumescence) the carbon skeleton, formed by carbonification, and, where appropriate, the softened binder to form a foam; this term is used interchangeably with "gas formers";

an "ash crust stabilizer" is a so-called skeleton forming compound that stabilizes the carbon skeleton (ash crust), which is formed from the interaction of the formation of the carbon from the carbon source and from the gas from the blowing agent or the physical intumescence. In this case the basic mode of action is that the resulting carbon layers, which are really very soft, are mechanically bonded by means of inorganic compounds. The addition of such an ash crust stabilizer contributes to a significant stabilization of the intumescent crust in the event of a fire, because these additives increase the mechanical strength of the intumescent layer and/or prevent this intumescent layer from dripping off, so that the insulating effect of the foam is maintained or enhanced.

an "oligomer" is a molecule with 2 to 5 repeating units; and a "polymer" is a molecule with 6 or more repeating units, and both the oligomer and the polymer may have structures that are linear, branched, star-shaped, wound, hyper-branched, or crosslinked; polymers may have a single type of repeating unit ("homopolymers"); or they may have more than one type of repeating units ("copolymers"). As used herein, "resin" is a synonym for polymer.

"epoxy equivalent weight" is defined as that amount of epoxy resin in [g] that has an equivalent [Val] epoxy function and is calculated from the molar mass M in [g/mol] divided by the functionality f in [Val/mol]; (EEW [g/Val] "[g/equivalent]").

It is generally assumed that the reaction of an epoxy resin having a functionality of two with a thio compound, in particular a thiol functionalized compound having a functionality of two, will lead to linear molecular structures. It is often necessary to generate molecular structures that are branched and/or crosslinked, for which reason it is probably necessary to use at least one ingredient having a functionality of greater than two. Therefore, the epoxy resin and/or the thio compound, in particular the thiol functionalized compound, is and/or are preferably multifunctional, where in this case the multifunctional epoxy resin or the multifunctional thio compound, in particular the multifunctional thiol functionalized compound, or both have even more preferably a functionality of greater than two (>2).

The epoxy resin that lends itself well in epoxy chemistry is typically epoxy resins. They are obtained in a well-known manner, for example, from the oxidation of the corresponding olefins, or from the reaction of epichlorohydrin with the appropriate polyols, polyphenols or amines. Basic information about and examples of epoxy resins may be found in the chapter "Epoxy Resins" Encyclopedia of Polymer Sciences and Technology, Vol. 9, Wiley-Interscience, 2004. Some examples of suitable epoxy resins include the reaction products of polyhydroxy compounds, in particular polyhydric phenols or phenol aldehyde condensates, with epihalogenohydrins or their precursors, in particular:

a) reaction products of epichlorohydrin with bisphenol A;
b) reaction products of epichlorohydrin with bisphenol S;
c) epoxy novolacs based on phenol or cresol;
d) aromatic glycidyl amine resins;
e) epoxy resins having no aromatic structural units;

as well as mixtures of two or more such epoxy resins in any ratio and in any degree of purity.

Particularly suitable epoxy resins are the so-called liquid poly epoxy resins, hereinafter referred to as "liquid resin". They have a glass transition temperature that is usually below 25 deg. C., in contrast to the so-called solid resins that have a glass transition temperature above 25 deg. C. and can be comminuted at 25 deg. C. to form pourable powders. Suitable compounds are the glycidylization products of:

dihydroxybenzene derivatives, such as resorcinol, hydroquinone and pyrocatechol;

other bisphenols or polyphenols, such as bis(4-hydroxy-3-methylphenyl) methane, 2,2-bis(4-hydroxy-3-methylphenyl) propane (bisphenol C), bis(3,5-dimethyl-4-hydroxyphenyl) methane, 2,2-bis(3,5-dimethyl-4-hydroxyphenyl) propane, 2,2-bis(3,5-dibromo-4-hydroxyphenyl) propane, 2,2-bis(4-hydroxy-3-tert.-butylphenyl) propane, 2,2-bis(4-hydroxyphenyl) butane (bisphenol B), 3,3-bis(4-hydroxyphenyl) pentane, 3,4-bis(4-hydroxyphenyl) hexane, 4,4-bis(4-hydroxyphenyl) heptane, 2,4-bis(4-hydroxyphenyl)-2-methylbutane, 2,4-bis(3,5-dimethyl-4-hydroxyphenyl)-2-methylbutane, 1,1-bis(4-hydroxyphenyl) cyclohexane (bisphenol Z), 1,1-bis(4-hydroxyphenyl)-3,3,5-trimethylcyclohexane (bisphenol TMC), 1,1-bis(4-hydroxyphenyl)-1-phenylethane, 1,4-bis[2-(4-hydroxyphenyl)-2-propyl]-benzene) (bisphenol P), 1,3-bis[2-(4-hydroxyphenyl)-2-propyl]benzene) (bisphenol M), 4,4'-dihydroxydiphenyl (DOD), 4,4'-dihydroxybenzophenone, bis-(2-hydroxynaphth-1-yl) methane, bis(4-hydroxynaphth-1-yl) methane 1,5-dihydroxynaphthalene, tris(4-hydroxyphenyl) methane, 1,1,2,2-tetrakis-(4-hydroxyphenyl) ethane bis(4-hydroxyphenyl) ether, bis(4-hydroxyphenyl) sulfone;

condensation products of phenols with formaldehyde, which are obtained under acid conditions, such as phenol novolacs or cresol novolacs, also called bisphenol F novolacs;

aromatic amines, such as aniline, toluidine, 4-aminophenol, 4,4'-diphenylmethanediamine (MDA), 4,4'-methylendiphenyldi-(N-methyl)amine, 4,4'-[1,4-phenylenebis(1-methyl-ethylidene)]-bisaniline (bisaniline P), 4,4'-[1,3-phenylene-bis-(1-methyl-ethylidene)]bisaniline (bisaniline M);
as well as mixtures of two or more such epoxy resins in any ratio and in any degree of purity.

Also preferred within the scope of the invention are reaction products of epichlorohydrin with bisphenol A having an epoxy equivalent weight (EEW)≤550 g/Val [g/equivalent]; reaction products of epichlorohydrin with bisphenol F, the simplest representative of the novolacs, having an EEW≤500 g/eq; any mixtures of these two reaction products, reaction products of an arbitrary mixture of bisphenol A and bisphenol F with epichlorohydrin, epoxy resins, such as hydantoin based epoxy resins or diglycidyl ethers of hydrogenated bisphenol A or bisphenol F; as well as mixtures of two or more such epoxy resins in any ratio and in any degree of purity.

Particularly preferred are reaction products of epichlorohydrin with bisphenol A having an EEW≤330 g/eq; reaction products of epichlorohydrin with bisphenol F, the simplest representative of the novolacs, having an EEW≤300 g/eq, any mixture of these two reaction products; reaction products of any mixture of bisphenol A and bisphenol F with epichlorohydrin having an EEW≤330 g/eq, 5,5-dimethyl-1,3-bis(2,3-epoxypropyl)-2,4-imidazolidinedione; 2,2-bis[4-(2,3-epoxypropoxy)-cyclohexyl]propane; as well as mixtures of two or more such epoxy resins in any ratio and in any degree of purity.

Even more highly preferred are reaction products of epichlorohydrin with bisphenol A having an EEW≤200 g/eq, such as, for example, Epilox® A 17-01, Epilox® A 18-00, Epilox® A 19-00, Epilox® A 19-02, Epilox® A 19-03 or Epilox® A 19-04 from the company Leuna-Harze GmbH, said resins represented by the following formula, where 0≤n≤0.2;

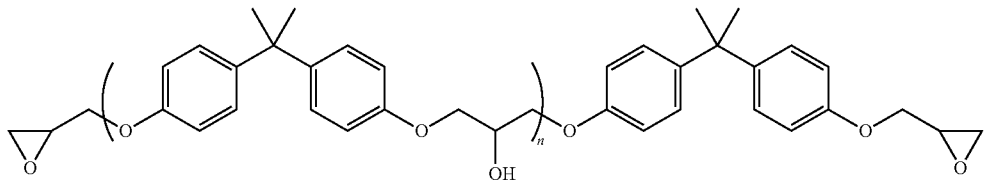

Reaction products of epichlorohydrin with bisphenol F, the simplest representative of the novolacs, having an EEW≤185 g/eq, such as, for example, Epilox® F 16-01 or Epilox® F 17-00 from the company Leuna-Harze GmbH, said resins represented by the following formula, where 0≤n≤0.2;

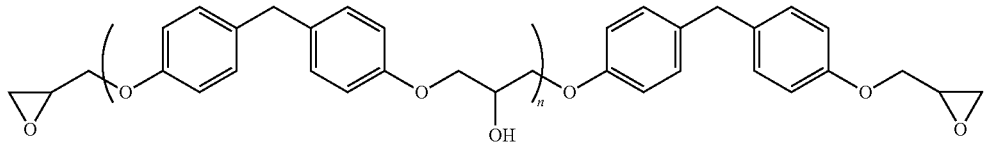

and mixtures of two or more such epoxy resins in any ratio and in any degree of purity, such as, for example, Epilox® AF 18-30, Epilox® 18-50 or Epilox® T 19-27 from the company Leuna-Harze GmbH, as well as reaction products of any mixture of bisphenol A and bisphenol F with epichlorohydrin having an EEW≤200 g/eq.

A suitable epoxy resin is also an aliphatic or cycloaliphatic poly epoxy, such as, for example:
- a glycidyl ether of a saturated or unsaturated, branched or unbranched, cyclic or open chain $C_2$ to $C_{30}$ diol, such as, for example, ethylene glycol, propylene glycol, butylene glycol, hexanediol, octanediol, a polypropylene glycol, dimethylolcyclohexane, neopentyl glycol or dibromoneopentyl glycol;
- a glycidyl ether of a tri functional or tetra functional, saturated or unsaturated, branched or unbranched, cyclic or open chain polyol, such as castor oil, trimethylol propane, trimethylol ethane, pentaerythritol, sorbitol or glycerol as well as alkoxylated glycerol or alkoxylated trimethylolpropane;
- a hydrogenated liquid bisphenol A or F resin or a liquid bisphenol A/F resin, or more specifically the glycidylization products of hydrogenated bisphenol A, F or A/F;
- an N-glycidyl derivative of amides or heterocyclic nitrogen bases, such as triglycidyl cyanurate and triglycidylisocyanurate, as well as reaction products of epichlorohydrin and hydantoin.

A potential epoxy resin is also a solid bisphenol A, F or A/F resin, which is constructed in a manner similar to the aforementioned liquid resins of the above two formulas, but, instead of the index n, has a value of 2 to 12 and has a glass transition temperature of above 25 deg. C.

Finally suitable epoxy resins are also epoxy resins from the oxidation of olefins, for example from the oxidation of vinylcyclohexene, dicyclopentadiene, cyclohexadiene, cyclododecadiene, cyclododecatriene, isoprene, 1,5-hexadiene, butadiene, polybutadiene, or divinylbenzene.

Depending on the functionality of the epoxy resin, the degree of crosslinking of the binder and, thus, not only the strength of the resulting coating, but also its elastic properties can be adjusted. At the same time this feature has a direct impact on the achievable expansion of the resulting ash crust in the event of a fire.

By adding at least one reactive diluent, the viscosity of the composition can be adjusted or more specifically can be adapted according to the application properties.

Therefore, in one embodiment of the invention the composition contains, if necessary, additional compounds, which contain epoxy groups, as the reactive diluents. These compounds contain one or more epoxy groups. In principle, any low viscosity compound that bears at least one epoxy group per molecule can be used. It is possible to combine two or more different reactive diluents. Suitable examples are allyl glycidyl ether, butyl glycidyl ether (BGE), 2-ethylhexyl glycidyl ether, alkyl glycidyl ether ($C_{12}$ to $C_{14}$), tridecyl glycidyl ether, phenyl glycidyl ether (PGE), o-cresol glycidyl ether (CGE), p-tert-butyl glycidyl ether, resorcinol diglycidyl ether (RDGE), 1,4-butanediol diglycidyl ether (BDGE), 1,6-hexanediol diglycidyl ether (HDGE), cyclohexanedimethanol diglycidyl ether, neopentyl glycol diglycidyl ether, trimethylolpropane triglycidyl ether, glycerol triglycidyl ether, polypropylene glycol diglycidyl ether, as well as epoxidized vegetable oils, such as, for example, epoxidized linseed oil and epoxidized castor oil.

It may be expedient to use any thio compound, which can react with epoxy compounds, as the curing agent. In this respect they are preferably thiol functionalized compounds, where in this case the thiol group (—SH) forms the functional group.

It may be expedient to use any compound, which has at least two thiol groups, as the thiol functionalized compound. In this case each thiol group is attached to a skeleton either directly or by way of a linker.

The thiol functionalized compound of the present invention may have any of a wide variety of skeletons, which may be the same or different.

According to the invention, the skeleton is a monomer, an oligomer or a polymer.

In some embodiments of the present invention the skeleton comprises monomers, oligomers or polymers having a molecular weight (Mw) of 50,000 g/mol or less, preferably 25,000 g/mol or less, more preferably 10,000 g/mol or less, even more preferably 5,000 g/mol or less, more highly preferred 2,000 g/mol or less, and most highly preferred 1,000 g/mol or less.

Some examples of monomers that can be mentioned as being suitable for use as skeletons include alkane diols, alkylene glycols, sugars, polyhydric derivatives thereof, or mixtures thereof, and amines, such as ethylenediamine and hexamethylenediamine, and thiols. Some examples of oligomers or polymers that can be mentioned as being suitable for use as skeletons, include the following: polyalkylene oxide, polyurethane, polyethylene, polyvinyl, polydiene, hydrogenated polydiene, alkyd, alkyd polyesters, (meth) acrylic polymer, polyolefin, polyester, halogenated polyolefin, a halogenated polyester, polymercaptan as well as copolymers or mixtures thereof.

In preferred embodiments of the invention the skeleton is a polyhydric alcohol or a polyvalent amine, which may be monomeric, oligomeric or polymeric. It is even more preferred that the skeleton be a polyhydric alcohol.

In this case some examples of polyhydric alcohols that can be mentioned as being suitable for use as skeletons are the following: alkanediols, such as butanediol, pentanediol, hexanediol, alkylene glycols, such as ethylene glycol, propylene glycol and polypropylene glycol, glycerol, 2-(hydroxymethyl) propane-1,3-diol, 1,1,1-tris(hydroxymethyl) ethane, 1,1,1-trimethylolpropane, di(trimethylolpropane), tricyclodecanedimethylol, 2,2,4-trimethyl-1,3-pentanediol, bisphenol A, cyclohexanedimethanol, alkoxylated and/or ethoxylated and/or propoxylated derivatives of neopentyl glycol, tetraethylene glycol cyclohexanedimethanol, hexane diol, 2-(hydroxymethyl) propane-1,3-diol, 1,1,1-tris(hydroxymethyl) ethane, 1,1,1-trimethylol propane and castor oil, pentaerythritol, sugars, polyhydric derivatives thereof, or mixtures thereof.

It is possible to use, as the linker, any unit that is suitable to connect the skeleton and the functional group. For thiol functionalized compounds the linker is selected preferably from the structures (I) to (XI).

1: Bonding to the functional group
2: Bonding to the skeleton

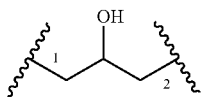

(I)

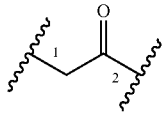

(II)

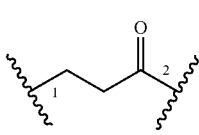

(III)

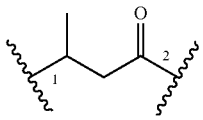

(IV)

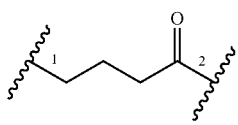

(V)

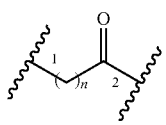

$4 \Leftarrow n \Leftarrow 10$ (VI)

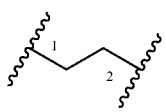

(VII)

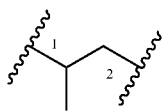

(VIII)

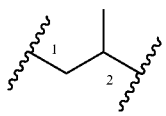

(IX)

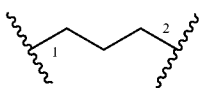

(X)

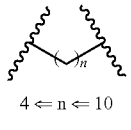

$4 \Leftarrow n \Leftarrow 10$ (XI)

The structures (I), (II), (III) and (IV) are especially preferred as the linkers for thiol functionalized compounds.

Particularly preferred thiol functionalized compounds are esters of alpha-thioacetic acid (2-mercaptoacetate), betathiopropionic acid (3-mercaptopropionates) and 3-thiobutyric acid (3-mercaptobutyrate) with mono alcohols, diols, triols, tetraols, pentaols or other polyols as well as 2-hydroxy-3-mercaptopropyl derivatives of mono alcohols, diols, triols, tetraols, pentaols or other polyols. In this case mixtures of alcohols can also be used as a basis for the thiol functionalized compound. In this respect reference is made to WO 99/51663 A1, the disclosure of which is hereby incorporated by reference in this patent application.

Some examples of thiol functionalized compounds that can be mentioned as being especially suitable include: glycol-bis(2-mercaptoacetate), glycol-bis(3-mercaptopropionate), 1,2-propylene glycol bis(2-mercaptoacetate), 1,2-propylene glycol bis(3-mercaptopropionate), 1,3-propylene glycol bis(2-mercaptoacetate), 1,3-propylene glycol bis(3-mercaptopropionate), tris(hydroxymethyl) methane tris(2-mercaptoacetate), tris(hydroxymethyl) methane tris(3-mercaptopropionate), 1,1,1-tris(hydroxymethyl) ethane tris(2-mercaptoacetate), 1,1,1-tris(hydroxymethyl) ethane tris(3-mercaptopropionate), 1,1,1-trimethylolpropane tris(2-mercaptoacetate), ethoxylated 1,1,1-trimethylolpropane tris(2-mercaptoacetate), propoxylated 1,1,1-trimethylolpropane tris(2-mercaptoacetate), 1,1,1-trimethylolpropane tris(3-mercaptopropionate), ethoxylated 1,1,1-trimethylolpropane tris(3-mercaptopropionate), propoxylated trimethylolpropane tris(3-mercaptopropionate), 1,1,1-trimethylolpropane tris(3-mercaptobutyrate), pentaerythritol tris(2-mercaptoacetate), pentaerythritol tetrakis(2-mercaptoacetate), pentaerythritol tris(3-mercaptopropionate), pentaerythritol tetrakis(3-mercaptopropionate), pentaerythritol tris(3-mercaptobutyrate), pentaerythritol tetrakis(3-mercaptobutyrate), polymercaptans, 2-ethylhexyl thioglycolate, iso-octyl thioglycolate, di(n-butyl) thiodiglycolate, glycol-di-3-mercaptopropionate, 1,6-hexanedithiol, ethylene glycol bis(2-mercaptoacetate) and tetra(ethylene glycol) dithiol.

The thiol functionalized compound can be used alone or as a mixture of two or more different thiol functionalized compounds.

It is possible, depending on the functionality of the thiol functionalized compound, to adjust the degree of crosslinking of the binder and, thus, not only the strength of the resulting coating, but also its elastic properties. At the same time this feature has a direct impact on the achievable expansion of the resulting ash crust in the event of a fire.

In the composition of the present invention the relative proportion of epoxy resins to thiol functionalized compounds can be characterized by means of the reactive equivalent ratio, which is the ratio of the total number of epoxy groups in the composition to the number of thiol groups in the composition. The reactive equivalent ratio is 0.1 to 10:1, preferably 0.2 to 5:1, more preferably 0.3 to 3:1, even more preferably 0.5 to 2:1 and even more highly preferred 0.75 to 1.25:1.

A conventional amine curing agent for epoxy resins may be used optionally as an additional hardener component, also referred to as the co-curing agent. Suitable examples may be found in the chapter "Epoxy Resins" in the Encyclopedia of Polymer Sciences and Technology, Vol. 9, Wiley-Interscience, 2004. In particular, aliphatic or aromatic amines, amido amines, polyamides, polyamine/epoxy resin adducts and/or ketimines have proved to be useful. The amine curing agents can be used individually or as a mixture of two or more compounds. Examples include ethylenediamine, propylenediamine, hexamethylenediamine, diethylenetriamine (DETA), tetraethylenetetramine (TETA), isophoronediamine (IPDA), meta-xylylenediamine (mXDA), N-methylbenzylamine (NMB) or Ancamide® (Air Products), diethylaminopropylamine (DEAPA), N-aminoethylpiperazine (N-AEP), diaminodiphenyl sulfone (DDS), 1,8-diamino-p-menthane (MDA). Similarly polyether amines, such as Jeffamine® D-230 (Huntsman), Jeffamine® D-400 (Huntsman), Jeffamine® T-403 (Huntsman) can be used.

The coating properties can be adjusted by means of a suitably selected mixture of thio compound, in particular thiol functionalized compound and amines, as the curing agent for the epoxy resin.

Preferably a catalyst is used for the curing, i.e., the reaction of the epoxy resin with the thio compound, in particular the thiol functionalized compound. The use of a catalyst makes it possible to obtain compositions that cure rapidly, i.e. within a few minutes, and completely even at room temperature, a feature that makes such compositions very attractive for use on site, for example, at the construction site.

The catalysts that can be used include the compounds that are usually used for reactions between epoxy resins and thiol functionalized compounds, such as tertiary amines, for example benzyldimethylamine, N,N-dimethylpropylamine, 1,8-diazabicyclo[5.4.0]undec-7-ene and bis-N,N-dimethylethanolamine ether, phenol derivatives, for example, nonylphenol, and the like which are known to the person skilled in the art. In this respect reference is made to WO 2012/082224 A 1, the disclosure of which is hereby incorporated by reference in this patent application.

In a preferred embodiment of the invention the constituent B also contains an aminophenol or an ether thereof, which has at least one tertiary amino group optionally together with a primary and/or secondary amino group, as a catalyst. The catalyst is preferably selected from compounds of the general formula (XX),

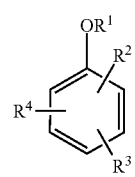

(XX)

where $R^1$ is hydrogen or a linear or branched $C_1$ to $C_{15}$ alkyl radical; $R^2$ is $(CH_2)_n NR^5 R^6$— or $NH(CH_2)_n NR^5 R^6$—, where $R^5$ and $R^6$ are independently of each other a linear or branched $C_1$ to $C_{15}$ alkyl radical; and n=0 or 1; $R^3$ and $R^4$ are independently of each other hydrogen, $(CH_2)_n NR^7 R^8$ or $NH(CH_2)_n NR^7 R^8$; $R^7$ and $R^8$ are independently of each other hydrogen or a linear or branched $C_1$ to $C_{15}$ alkyl radical; and n=0 or 1.

$R^1$ is preferably hydrogen or a $C_1$ to $C_{15}$ alkyl radical, in particular a linear $C_1$ to $C_{15}$ alkyl radical, more preferably methyl or ethyl and most preferably methyl.

Preferably the phenol of the formula (XX) is substituted in 2, 4 and 6 position. That is, the substituents $R^2$, $R^3$ and $R^4$ are sitting in 2, 4 and 6 position.

In the case that $R^5$, $R^6$, $R^7$ and $R^8$ are alkyl radicals, they are preferably a $C_1$ to $C_5$ alkyl radical, more preferably methyl or ethyl and most preferably methyl.

Either a compound or a mixture of at least two compounds of formula (XX) can be used as the catalyst.

Preferably the catalyst is selected from 2,4,6-tris(dimethylaminomethyl) phenol, bis(dimethylaminomethyl) phenol and 2,4,6-tris(dimethylamino) phenol. The catalyst 2,4,6-tris(dimethylaminomethyl) phenol is preferred the most.

A preferred catalyst mixture contains 2,4,6-tris(dimethylaminomethyl) phenol and bis(dimethylaminomethyl) phenol. Such mixtures are commercially available, for example, as Ancamine® K-54 (AirProducts, Belgium).

According to the invention, the constituent C contains one intumescent additive, where in this case the additive may include both single compounds as well as a mixture of several compounds.

It is expedient to use, as the intumescent additives, those intumescent additives that act by forming an expanded insulating layer, which is formed subject to exposure to heat, from a flame retardant material that protects the substrate from overheating and, in so doing, prevents or at least delays the change in the mechanical and structural properties of load bearing components due to the impact of heat. The formation of a voluminous insulating layer, in other words an ash layer, can be formed by the chemical reaction of a mixture of correspondingly matched compounds that react with each other when exposed to heat. Such systems are known to the person skilled in the art under the term chemical intumescence and can be used according to the invention. As an alternative, the voluminous insulating layer may be formed through expansion of a compound that, when exposed to heat, releases gases even though no chemical reaction has taken place between two compounds. Such systems are known to the person skilled in the art under the term physical intumescence and can also be used according to the invention. Each of these two systems can be used, according to the invention, either alone or together as a combination.

In order to form an intumescent layer by chemical intumescence, at least three components are generally required: a carbon source, a dehydrogenation catalyst and a blowing agent; and in the case of coatings, for example, these three components are present in a binder. Under the influence of heat, the binder softens and the fire retardant additives are released so that in the case of chemical intumescence they react with each other or in the case of physical intumescence they could swell. The acid, which is used as a catalyst for carbonification of the carbon source, is formed from the dehydrogenation catalyst by thermal decomposition. At the same time the blowing agent decomposes thermally to form inert gases, said formation of inert gases causes the carbonized (charred) material and optionally the softened binder to swell and, in so doing, to form a voluminous insulating foam.

In one embodiment of the invention, in which the insulating layer is formed by chemical intumescence, the intumescent additive comprises at least one carbon skeleton former, in so far as the binder cannot be used as such, at least one acid former, at least one blowing agent, and at least one inorganic skeleton former. The components of the additive are selected in such a special way that they can develop a synergism, so that some of the compounds can fulfill a plurality of functions.

The carbon sources that may be considered include the compounds that are commonly used in intumescent fire retardant formulations and are known to those skilled in the art, as starch-like compounds, for example starch and modified starch, and/or polyhydric alcohols (polyols), such as saccharides and polysaccharides and/or a thermoplastic or duroplastic polymeric resin binder, such as a phenolic resin, a urea resin, a polyurethane, polyvinyl chloride, poly(meth)acrylate, polyvinyl acetate, polyvinyl alcohol, a silicone resin and/or a rubber. Suitable polyols are polyols selected from the group sugar, pentaerythritol, dipentaerythritol, tripentaerythritol, polyvinyl acetate, polyvinyl alcohol, sorbitol, polyoxyethylene/polyoxypropylene (EO-PO) polyols. Pentaerythritol, dipentaerythritol or polyvinyl acetate are preferably used.

It should be mentioned that in the event of a fire the binder itself may also have the function of a carbon source.

The dehydrogenation catalysts or acid formers that may be considered are the compounds that are commonly used in intumescent fire retardant formulations and are known to those skilled in the art, such as a salt or an ester of an inorganic, non-volatile acid selected from sulfuric acid, phosphoric acid or boric acid. Essentially phosphorus-containing compounds are used. The range of these phosphorus-containing compounds is very wide, since they extend over a plurality of oxidation stages of the phosphorus, such as phosphines, phosphine oxides, phosphonium compounds, phosphates, elemental red phosphorus, phosphites and phosphates. Some examples of the phosphoric acid compounds that may be mentioned include: monoammonium phosphate, diammonium phosphate, ammonium phosphate, ammonium polyphosphate, melamine phosphate, melamine resin phosphate, potassium phosphate, polyol phosphates, such as pentaerythritol phosphate, glycerol phosphate, sorbitol phosphate, mannitol phosphate, dulcite phosphate, neopentyl glycol phosphate, ethylene glycol phosphate, dipentaerythritol phosphate and the like. A polyphosphate or an ammonium polyphosphate is used preferably as the phosphoric acid compound. In this case the term melamine resin phosphates is understood to mean compounds, such as reaction products of Lamelite C (melamine formaldehyde resin) with phosphoric acid. Some examples of sulfuric acid compounds that may be mentioned include: ammonium sulfate, ammonium sulfamate, nitroaniline bisulfate, 4-nitroaniline-2-sulfonic acid and 4,4-dinitrosulfanilamide and the like. Melamine borate may be mentioned as an example for the boric acid compound.

The blowing agents that may be considered are the compounds that are commonly used in fire retardant formulations and are known to those skilled in the art, such as cyanuric acid or isocyanic acid and derivatives thereof, melamine and derivatives thereof. Such are cyanamide, dicyanamide, dicyandiamide, guanidine and the salts thereof, biguanide, melamine cyanurate, cyanic acid salts, cyanic acid esters and cyanic acid amides, hexamethoxymethyl melamine, dimelamine pyrophosphate, melamine polyphosphate, melamine phosphate. Preferably hexamethoxymethyl melamine or melamine (cyanuric acid amide) is used.

Suitable components are also those components that do not limit their mode of action to a single function, such as melamine polyphosphate, which acts both as an acid former and as a blowing agent. Additional examples are described in GB 2 007 689 A1, EP 139 401 A1 and U.S. Pat. No. 3,969,291 A1.

In one embodiment of the invention, in which the insulating layer is formed by physical intumescence, the intumescent additive comprises at least one thermoexpandable compound, like a graphite intercalation compound, which is also known as an exfoliated graphite. It can also be incorporated into the binder.

Suitable exfoliated graphites include, for example, known intercalation compounds of $SO_x$, $NO_x$, halogen and/or strong acids in graphite. They are also referred to as graphite salts. Preferred are the exfoliated graphites that release on swelling $SO_2$, $SO_3$, NO and/or $NO_2$ at temperatures of, for example, 120 to 350 deg. C. The exfoliated graphite may be present, for example, in the form of platelets having a maximum diameter in the range of 0.1 to 5 mm. Preferably this diameter is in the range 0.5 to 3 mm. For the present invention, suitable exfoliated graphites are commercially available. In general, the exfoliated graphite particles are uniformly distributed in the fire retardant elements of the invention. However, the concentration of exfoliated graphite particles can also be varied in the manner of points or a pattern, as a flat area and/or a sandwich. In this respect reference is made to EP 1489136 A1, the disclosure of which is hereby incorporated by reference in this patent application.

Since the ash crust that is formed in the event of a fire is usually too unstable and, as a function of its density and structure, can be blown about, for example, by air currents, a feature that has an adverse effect on the insulating effect of the coating, preferably at least one ash crust stabilizer is added to the components just listed.

Some examples of the ash crust stabilizers or more specifically the skeleton formers that may be considered are the compounds that are commonly used in fire retardant formulations and are known to those skilled in the art: exfoliated graphite and particulate metals, such as aluminum, magnesium, iron and zinc. The particulate metal may be in the form of a powder, platelets, scales, fibers, filaments and/or whiskers, where in this case the particulate metal in the form of a powder, platelets or scales has a particle size of ≤50 µm, preferably from 0.5 to 10 µm. In the event that the particulate metal is used in the form of filaments and/or whiskers, a thickness of 0.5 to 10 µm and a length of 10 to 50 µm are preferred. As an alternative or in addition, it is possible to use, as the ash crust stabilizer, an oxide or a compound of a metal from the group comprising aluminum, magnesium, iron or zinc, in particular an iron oxide, preferably ferric trioxide, titanium dioxide, a borate, such as zinc borate and/or a glass frit of low melting glasses having a melting temperature of preferably at or above 400 deg. C., phosphate or sulfate glasses, melamine poly zinc sulfates, ferro glasses or calcium borosilicates. The addition of such an ash crust stabilizer contributes to a significant stabilization of the ash crust in the event of a fire, since these additives enhance the mechanical strength of the intumescent layer and/or prevent said layer from dripping off. Examples of such additives may also be found in U.S. Pat. No. 4,442,157 A, U.S. Pat. No. 3,562,197 A, GB 755 551 A GB 755 551 A as well as EP 138 546 A1.

In addition, such ash crust stabilizers as melamine phosphate or melamine borate may be included.

Optionally one or more reactive flame retardants may be added to the composition of the invention. Such compounds are incorporated into the binder. One example in the context of the invention includes the reactive organophosphorus compounds, such as 9,10-dihydro-9-oxa-10-phosphaphenanthrene-10-oxide (DOPO) and its derivatives, such as DOPO HQ, DOPO NQ, and adducts. Such compounds are described, for example, by S. V. Levchik, E. D. Weil in Polym. Int. 2004, vol. 53, pp. 1901-1929.

In addition to the intumescent additives, the composition may contain, if desired, conventional adjuvants, such as solvents, for example, xylene or toluene, wetting agents, for example, based on polyacrylates and/or polyphosphates, defoamers, such as silicone defoamers, thickeners, such as alginate thickeners, dyes, fungicides, plasticizers, such as chlorinated waxes, binders, flame retardants and various fillers, such as vermiculite, inorganic fibers, silica sand, glass micro beads, mica, silica, mineral wool, and the like.

Additional additives, such as thickeners, rheological additives and fillers, can be added to the composition. Preferably polyhydroxycarboxylic acid amides, urea derivatives, salts of unsaturated carboxylic esters, alkylammonium salts of acidic phosphoric acid derivatives, ketoximes, amine salts of p-toluene sulfonic acid, amine salts of sulphonic acid derivatives and aqueous or organic solutions or mixtures of the compounds are used as the rheological additives, such as anti-settling agents, anti-sag agents and thixotropic agents. In addition, it is possible to use rheological additives based on pyrogenic or precipitated silicic acids or based on silanized pyrogenic or precipitated silicic acids. Preferably the rheological additives are pyrogenic silicic acids, modified and unmodified phyllosilicates, precipitated silicic acids, cellulose ethers, polysaccharides, polyurethane thickeners and acrylic thickeners, urea derivatives, castor oil derivatives, polyamides and fatty acid amides and polyolefins, unless they are in solid form, powdered cellulose and/or suspending agents, such as xanthan gum.

The inventive composition can be formulated as a two component system or as a multi component system.

When the constituent A and the constituent B do not react with each other at room temperature without the use of a catalyst, they can be stored together. If a reaction occurs at room temperature, the constituent A and the constituent B have to be arranged separately to inhibit a reaction. In the presence of a catalyst said catalyst has to be stored either separately from the constituents A and B, or the constituent, which contains the catalyst, has to be stored separately from the other constituent. This approach makes it possible to achieve the objective that the two constituents A and B of the binder are not mixed together until immediately prior to application and trigger the curing reaction. This feature makes the system easier to use.

In a preferred embodiment of the invention the composition according to the invention is formulated as a two component system, where in this case the constituent A and the constituent B are arranged separately to inhibit a reaction. Correspondingly a first component, the component I, contains the constituent A; and a second component, the component II, contains the constituent B. This approach makes it possible to achieve the objective that the two constituents A and B of the binder are not mixed with one another until immediately prior to use and initiate the curing reaction. This feature makes the system easier to use.

In this case the at least one epoxy resin is present preferably in an amount of 15 to 95% by wt. in the component I.

If a reactive diluent is used, then this reactive diluent is present in an amount of 90 to 2% by wt., preferably 70 to 3% by wt. more preferably from 50 to 4% by wt. and even more preferably 40 to 5% by wt. in the component I.

The thio compound, in particular the thiol functionalized compound, is present preferably in an amount of 0.5 to 90% by wt., in particular preferably in an amount of 2 to 85% by wt., in the component II.

In this case the constituent C can be present as a total mixture or divided into individual components in a first component I and/or a second component II. The distribution of the constituent C is carried out, as a function of the compatibility of the compounds present in the composition, so that neither a reaction of the compounds present in the composition with one another or a mutual interference nor a reaction of these compounds with the compounds of the other constituents can take place. This feature depends on the compounds that are used. This approach ensures that the highest possible proportion of fillers can be achieved. This objective in turn leads to a high intumescence, even at low coating thicknesses of the composition.

The intumescent additive may be present in an amount of 30 to 99% by wt. in the composition, where in this case the amount depends more or less on the form of the application of the composition (spraying, brushing and the like). In order to bring about the highest possible rate of intumescence, the constituent C content is set as high as possible in the total formulation.

Preferably the proportion of the constituent C in the total formulation is 35 to 85% by wt. and even more preferred 40 to 85% by wt.

The composition is applied as a paste with a brush, a roller or by spraying onto the substrate, in particular a metallic substrate. Preferably the composition is applied by means of an airless spray method.

The composition of the invention is characterized, in comparison with the solvent based and water based systems, by a relatively fast curing due to an addition reaction and, therefore, unnecessary drying. This feature is important, especially if the coated components have to be quickly loaded or further processed, either by coating with a cover layer or by moving or transporting the components. As a result, the coating is much less susceptible to external influences at the construction site, such as, for example, exposure to (rain) water or dust and dirt, which can lead to the leaching of the water soluble constituents, such as ammonium polyphosphate, in solvent based or water based systems, or, if dust is absorbed, it can lead to a decrease in the intumescence. Owing to the low viscosity of the composition despite the high solids content, the composition remains easy to process, in particular, by means of a continuous spraying operation. Owing to the low softening point of the binder and the high solids content, the expansion rate is high, on exposure to heat, even if the layer thickness is low.

Therefore, the two component or multi component composition according to the invention lends itself well, as a coating, in particular as a fire retardant coating, preferably a sprayable coating for metal based and non-metal based substrates. The substrates are not limited and include components, in particular steel components and wood components, as well as individual cables, bundles of cables, cable trays and cable ducts or other conduits.

The composition according to the invention is used predominately in the construction industry as a coating, in particular as a fire retardant coating for steel structure elements, as well as for structural elements made of other materials, such as concrete or wood, as well as a fire retardant coating for single cables, bundles of cables, cable trays and cable ducts or other conduits.

Therefore, an additional subject matter of the invention is the use of the inventive composition as a coating, in particular as a coating for structural elements or construction elements of steel, concrete, wood and other materials, such as synthetic plastic materials, in particular, as a fire retardant coating.

The present invention also relates to objects that are obtained when the inventive composition is cured. The objects have excellent intumescent properties.

The following examples serve to further illustrate the invention.

EXEMPLARY EMBODIMENTS

In order to prepare insulating layer-forming compositions according to the invention, the individual components are mixed and homogenized, as specified below, with the aid of a dissolver.

In each case the curing behavior was monitored; then the intumescence factor and the relative ash crust stability were determined. For this purpose each of the compositions was placed in a round Teflon mold with a depth of about 2 mm and a diameter of 48 mm.

In this context the time for the curing corresponds to the time, after which the samples were completely cured and could be removed from the Teflon mold.

In order to determine the intumescent factor and the relative ash crust stability, a muffle furnace was preheated to 600 deg. C. Multiple measurements of the sample thickness were carried out with the caliper; and the mean value $h_M$ was calculated. Then each sample was placed in a cylindrical steel mold and heated for 30 min. in a muffle furnace. After cooling to room temperature, the foam height $h_{E1}$ was first determined in a non-destructive manner (mean value of multiple measurements). The intumescent factor I is calculated as follows:

intumescent factor I: $I = h_{E1} : h_M$

Then a defined weight (m=105 g) was allowed to fall from a defined height (h=100 mm) onto the foam in the cylindrical steel mold; and then the foam height $h_{E2}$ that remained after this partially destructive action was determined. The relative ash crust stability was calculated as follows:

relative ash crust stability (AKS): $AKS = h_{E2} : h_{E1}$

Furthermore, the shrinkage was measured during the "drying", i.e. the reaction of the two components.

For this purpose, a mold having a thickness of 10 mm was filled with the respective mixtures. After curing, the molded article that had formed was removed from the mold; and the thickness was measured. The difference gives then the shrinkage.

In the following examples 1 to 5 the following composition was used as the constituent C:

| Constituent C: | |
| --- | --- |
| Constituent | Quantity [g] |
| pentaerythritol | 8.7 |
| melamine | 8.7 |
| ammonium polyphosphate | 16.6 |
| titanium dioxide | 7.9 |

Example 1

| Constituent A | |
| --- | --- |
| Constituent | Quantity [g] |
| Epilox AF 18-30[1] | 10.6 |

[1]epoxy resin based on bisphenol A/F

| Constituent B | |
| --- | --- |
| Constituent | Quantity [g] |
| Capcure ® 3-800[2] | 16.7 |
| Ancamine K54[3] | 0.7 |

[2]trifunctional aliphatic thiol
[3]pentaerythritol tetra(3-mercaptopropionate)

| Constituent C | |
|---|---|
| Constituent | Quantity [g] |
| as specified above | 42.1 |

In order to prepare a two component system, the constituent C was divided between the constituents A and B in such a way that the pentaerythritol is mixed together with the ammonium polyphosphate to form the component I; and the melamine is mixed together with the titanium dioxide to form the component II.

Example 2

| Constituent A | |
|---|---|
| Constituent | Quantity [g] |
| Epilox AF 18-30 | 13.6 |
| heloxy modifier HD[4] | 2.3 |

[4]hexanediol diglycidyl ether

| Constituent B | |
|---|---|
| Constituent | Quantity [g] |
| Thiocure ® PETMP[5] | 12.1 |
| Ancamine K54 | 0.1 |

[5]pentaerythritol tetra(3-mercaptopropionate)

| Constituent C | |
|---|---|
| Constituent | Quantity [g] |
| as specified above | 42.1 |

In order to prepare a two component system, all of the constituents A, B and C, except the catalyst, were mixed to form a first component I, so that the catalyst was formulated as the second component II.

Example 3

| Constituent A | |
|---|---|
| Constituent | Quantity [g] |
| Epilox AF 18-30 | 13.1 |
| heloxy modifier HD | 2.2 |

| Constituent B | |
|---|---|
| Constituent | Quantity [g] |
| Thiocure ® PETMP[6] | 12.7 |
| Ancamine K54 | 0.1 |

[6]trimethylolpropane tris(3-mercaptopropionate)

| Constituent C | |
|---|---|
| Constituent | Quantity [g] |
| as specified above | 42.1 |

In order to prepare a two component system, all of the constituents A, B and C, except the catalyst, were mixed to form a first component I, so that the catalyst was formulated as the second component II.

Example 4

| Constituent A | |
|---|---|
| Constituent | Quantity [g] |
| Epilox AF 18-30 | 13.7 |
| heloxy modifier HD | 2.3 |

| Constituent B | |
|---|---|
| Constituent | Quantity [g] |
| Thiocure ® TMPMA[7] | 11.9 |
| Ancamine K54 | 0.1 |

[7]trimethylolpentane tretramercaptoacetatate)

| Constituent C | |
|---|---|
| Constituent | Quantity [g] |
| as specified above | 42.1 |

In order to prepare a two component system, all of the constituents A, B and C, except for the catalyst, were mixed to form a first component I, so that the catalyst was formulated as the second component II.

Example 5

| Constituent A | |
|---|---|
| Constituent | Quantity [g] |
| Epilox AF 18-30 | 12.9 |
| heloxy modifier HD | 2.2 |

| Constituent B | |
|---|---|
| Constituent | Quantity [g] |
| KarenzMT PE 1[8] | 12.8 |
| Ancamine K54 | 0.2 |

[8]mixture of 77-94% pentaerythritol tetrakis(3-mercaptobutylate) and 3-20% pentaerythritol tris(3-mercaptobutanoate) (Showa Denko)

| Constituent C | |
|---|---|
| Constituent | Quantity [g] |
| as specified above | 42.1 |

In order to prepare a two component system, all of the constituents A, B and C, except for the catalyst, were mixed to form a first component I, so that the catalyst was formulated as the second component II.

Reference Example 1

A commercial fire retardant product (Hilti CFP S-WB), which is based on an aqueous dispersion technology, was used as the reference.

Reference Example 2

A standard epoxy amine system (Jeffamine T-403, liquid, solvent-free and crystallization stable epoxy resin consisting of low molecular weight epoxy resins based on bisphenol A and bisphenol F (Epilox AF 18-30, Leuna-Harze GmbH) and 1,6-hexanediol diglycidyl ether), which is filled to 60% with an intumescent mixture in a manner analogous to the above examples, was used as an additional reference.

Reference Example 3

A standard epoxy amine system (isophorone diamine, trimethylolpropane triacrylate and liquid, solvent-free and crystallization stable epoxy resin consisting of low molecular weight epoxy resins based on bisphenol A and bisphenol F (Epilox AF 18-30, Leuna-Harze GmbH), which is filled to 60% with an intumescent mixture in a manner analogous to the above examples, was used as an additional reference.

TABLE 1

Results of the measurements of the intumescent factor, the ash crust stability and the curing time

| Example | Intumescent factor I (multiple) | Relative ash crust stability AKS (multiple) | Sample thickness $h_M$ (mm) | Curing time (min.) |
|---|---|---|---|---|
| 1 | 38 | 0.86 | 5.8 | 10 minutes |
| 2 | 24 | 0.42 | 1.2 | 150 minutes |
| 3 | 21 | 0.43 | 1.4 | 150 minutes |
| 4 | 31 | 0.19 | 1.4 | 120 minutes |
| 5 | 14 | 0.71 | 2.8 | 50 minutes |
| reference example 1 | 36 | 0.62 | 1.8 | 10 days |
| reference example 2 | 22 | 0.04 | 1.6 | 12 hours |
| reference example 3 | 1.7 | 0.6 | 1.2 | 1 day |

The invention claimed is:

1. An insulating layer-forming composition, comprising:
   a first constituent, which contains at least one epoxy resin, wherein the epoxy resin has an EEW≤200 g/eq and is based on bisphenol A and bisphenol F reacted with epichlorohydrin,
   a second constituent, which contains at least one thio compound as a curing agent, and
   a third constituent, which contains an intumescent additive which is a mixture of pentaerythritol, melamine, ammonium polyphosphate and titanium dioxide, and
   a catalyst for the reaction of the epoxy resin with the thio compound,
   wherein the catalyst contains 2,4,6-tris(di-methylaminomethyl) phenol,
   wherein the composition is formulated as a two-component system; and the first constituent and the second constituent are divided between the two components, a first component and a second component, to inhibit a reaction, until curing is desired,
   wherein the at least one epoxy resin is present in an amount of 15 to 95% by wt. in the first component and the at least one thio compound is present in an amount of 0.5 to 90% by wt. in the second component,
   wherein the thio compound is at least one thiol functionalized compound selected from the group consisting of glycol-bis(2-mercaptoacetate), glycol-bis(3-mercaptopropionate), 1,2-propylene glycol bis(2-mercaptoacetate), 1,2-propylene glycol bis(3-mercaptopropionate), 1,3-propylene glycol bis(2-mercaptoacetate), 1,3-propylene glycol bis(3-mercaptopropionate), tris (hydroxymethyl) methane tris(2-mercaptoacetate), tris (hydroxymethyl) methane tris(3-mercaptopropionate), 1,1,1-tris(hydroxymethyl) ethane tris(2-mercaptoacetate), 1,1,1-tris(hydroxymethyl) ethane tris(3-mercaptopionate), 1,1,1-trimethylolpropane tris(2-mercaptoacetate), ethoxylated 1,1,1-trimethylolpropane tris(2-mercaptoacetate), propoxylated 1,1,1-trimethylolpropane tris(2-mercaptoacetate), 1,1,1-trimethylol propane tris(3-mercaptopropionate), ethoxylated 1,1,1-trimethylolpropane tris(3-mercaptopropionate), propoxylated trimethylolpropane tris(3-mercaptopropionate), 1,1,1-trimethylolpropane tris(3-mercaptobutyrate), pentaerythritol tris(2-mercaptoacetate), pentaerythritol tetrakis(2-mercaptoacetate), pentaerythritol tris(3-mercaptopropionate), pentaerythritol tetrakis(3-mercaptopropionate), pentaerythritol tris(3-mercaptobutyrate), pentaerythritol tetrakis(3-mercaptobutyrate), polymercaptans, 2-ethylhexyl thioglycolate, iso-octyl thioglycolate, di(n-butyl) thiodiglycolate, glycol-di-3-mercaptopropionate, 1,6-hexanedithiol, ethylene glycol bis(2-mercaptoacetate) and tetra(ethylene glycol) dithiol.

2. The insulating layer-forming composition of claim 1, wherein the at least one epoxy resin and the at least one thio compound are multifunctional.

3. The insulating layer-forming composition of claim 1, wherein the one or more thiol group(s) of the at least one thiol functionalized compound are bonded to a monomer, an oligomer or a polymer, as a skeleton.

4. The insulating layer-forming composition of claim 1, wherein the second constituent further contains at least one amine as a co-curing agent.

5. The insulating layer-forming composition of claim 4, wherein the at least one amine is selected from the group consisting of primary aliphatic amines, secondary aliphatic amines, and polyamines.

6. The insulating layer-forming composition of claim 1, wherein the ratio of the total number of epoxy groups to the number of thiol groups is in a range of 0.1:1 to 10:1.

7. The insulating layer-forming composition of claim 1, wherein the intumescent additive further contains at least one ash crust stabilizer.

8. The insulating layer-forming composition of claim 1, further comprising organic and/or inorganic aggregates and/or additional additives.

9. The insulating layer-forming composition of claim 1, wherein the first constituent is contained in the first component; and the second constituent is contained in the second component.

10. The insulating layer-forming composition of claim 1, wherein the third constituent is divided between the first component and the second component in such a way that the first component and the second component are separated from each other to inhibit a reaction.

11. The insulating layer-forming composition of claim 10, wherein the third constituent contains an ash crust stabilizer, which is divided between the first component and the second component in such a way that the first component or the second component contains at least a portion of the ash crust stabilizer.

12. A method of coating an article, said method comprising:
coating said article with an insulating layer-forming composition as claimed in claim 1.

13. The method as claimed in claim 12, wherein the article is a steel construction element.

14. The method as claimed in claim 12, wherein the article is a metallic and/or non-metallic substrate.

15. A fire retardant layer, comprising:
insulating layer-forming composition as claimed in claim 1.

16. A cured object, obtained by curing an insulating layer-forming composition, as claimed in claim 1.

17. A coated article, comprising:
an insulating layer-forming composition as claimed in claim 1.

18. The article as claimed in claim 17, which is a steel construction element.

19. The article as claimed in claim 17, which is a metallic and/or non-metallic substrate.

20. An insulating layer-forming composition, comprising:
a first constituent, which contains at least one epoxy resin, wherein the epoxy resin has an EEW≤200 g/eq and is based on bisphenol A and bisphenol F reacted with epichlorohydrin,
a second constituent, which contains at least one thio compound as a curing agent, and
a third constituent, which contains an intumescent additive which is a mixture of pentaerythritol, melamine, ammonium polyphosphate and titanium dioxide, and
a catalyst for the reaction of the epoxy resin with the thio compound,
wherein the catalyst is selected from compounds of formula (XX),

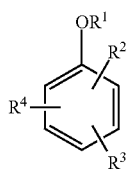

(XX)

wherein
$R^1$ is hydrogen or a linear or branched $C_1$ to $C_{15}$ alkyl radical;
$R^2$ is $(CH_2)_n NR^5 R^6$— or $NH(CH_2)_n NR^5 R^6$—,
wherein $R^5$ and $R^6$ are independently of each other a linear or branched $C_1$ to $C_{15}$ alkyl radical; and n=0 or 1;

$R^3$ and $R^4$ are independently of each other hydrogen, $(CH_2)_n NR^7 R^8$ or $NH(CH_2)_n NR^7 R^8$;
$R^7$ and $R^8$ are independently of each other hydrogen or a linear or branched $C_1$ to $C_{15}$ alkyl radical; and n=0 or 1;
wherein the composition is formulated as a two-component system; and the first constituent and the second constituent are divided between the two components, a first component and a second component, to inhibit a reaction, until curing is desired,
wherein the at least one epoxy resin is present in an amount of 15 to 95% by wt. in the first component and the at least one thio compound is present in an amount of 0.5 to 90% by wt. in the second component,
wherein the thio compound is at least one thiol functionalized compound selected from the group consisting of glycol-bis(2-mercaptoacetate), glycol-bis(3-mercaptopropionate), 1,2-propylene glycol bis(2-mercaptoacetate), 1,2-propylene glycol bis(3-mercaptopropionate), 1,3-propylene glycol bis(2-mercaptoacetate), 1,3-propylene glycol bis(3-mercaptopropionate), tris(hydroxymethyl) methane tris(2-mercaptoacetate), tris(hydroxymethyl) methane tris(3-mercaptopropionate), 1,1,1-tris(hydroxymethyl) ethane tris(2-mercaptoacetate), 1,1,1-tris(hydroxymethyl) ethane tris(3-mercaptopropionate), 1,1,1-trimethylolpropane tris(2-mercaptoacetate), ethoxylated 1,1,1-trimethylolpropane tris(2-mercaptoacetate), propoxylated 1,1,1-trimethylolpropane tris(2-mercaptoacetate), 1,1,1-trimethylol propane tris(3-mercaptopropionate), ethoxylated 1,1,1-trimethylolpropane tris(3-mercaptopropionate), propoxylated trimethylolpropane tris(3-mercaptopropionate), 1,1,1-trimethylolpropane tris(3-mercaptobutyrate), pentaerythritol tris(2-mercaptoacetate), pentaerythritol tetrakis(2-mercaptoacetate), pentaerythritol tris(3-mercaptopropionate), pentaerythritol tetrakis(3-mercaptopropionate), pentaerythritol tris(3-mercaptobutyrate), pentaerythritol tetrakis(3-mercaptobutyrate), polymercaptans, 2-ethylhexyl thioglycolate, iso-octyl thioglycolate, di(n-butyl) thiodiglycolate, glycol-di-3-mercaptopropionate, 1,6-hexanedithiol, ethylene glycol bis(2-mercaptoacetate) and tetra(ethylene glycol) dithiol.

21. The insulating layer-forming composition of claim 20, wherein $R^1$, $R^2$ and $R^3$ are in the 2-, 4- and 6-position of the phenol ring, respectively.

22. The insulating layer-forming composition of claim 20, wherein the catalyst is bis(dimethylaminomethyl)phenol.

23. An insulating layer-forming composition, comprising:
a first constituent, which contains at least one epoxy resin, wherein the epoxy resin has an EEW≤200 g/eq and is based on bisphenol A and bisphenol F reacted with epichlorohydrin,
a second constituent, which contains at least one thio compound as a curing agent, and
a third constituent, which contains an intumescent additive which is a mixture of pentaerythritol, melamine, ammonium polyphosphate and titanium dioxide, and
a catalyst for the reaction of the epoxy resin with the thio compound,
wherein the catalyst is 1,4-diazabicyclo[2.2.2]octane;
wherein the composition is formulated as a two-component system; and the first constituent and the second constituent are divided between the two components, a first component and a second component, to inhibit a reaction, until curing is desired, wherein the at least one epoxy resin is present in an amount of 15 to 95% by wt. in the first component and the at least one thio compound is present in an amount of 0.5 to 90% by wt. in the second component, wherein the thio compound is at least one thiol functionalized compound selected from the group consisting of glycol-bis(2-mercaptoacetate), glycol-bis(3-mercaptopropionate), 1,2-propylene glycol bis(2-mercaptoacetate), 1,2-propylene glycol bis(3-mercaptopropionate), 1,3-propylene glycol bis(2-mercaptoacetate), 1,3-propylene glycol bis(3-mercaptopropionate), tris(hydroxymethyl) methane tris(2-mercaptoacetate), tris(hydroxymethyl) methane tris(3-mercaptopropionate), 1,1,1-tris(hydroxymethyl) ethane tris(2-mercaptoacetate), 1,1,1-tris(hydroxymethyl) ethane tris(3-mercaptopropionate), 1,1,1-trimethylolpropane tris(2-mercaptoacetate), ethoxylated 1,1,1-trimethylolpropane tris(2-mercaptoacetate), propoxylated 1,1,1-trimethylolpropane tris(2-mercaptoacetate), 1,1,1-trimethylol propane tris(3-mercaptopropionate), ethoxylated 1,1,1-trimethylolpropane tris(3-mercaptopropionate), propoxylated trimethylolpropane tris(3-mercaptopropionate), 1,1,1-trimethylolpropane tris(3-mercaptobutyrate), pentaerythritol tris(2-mercaptoacetate), pentaerythritol tetrakis(2-mercaptoacetate), pentaerythritol tris(3-mercaptopropionate), pentaerythritol tetrakis(3-mercaptopropionate), pentaerythritol tris(3-mercaptobutyrate), pentaerythritol tetrakis(3-mercaptobutyrate), polymercaptans, 2-ethylhexyl thioglycolate, iso-octyl thioglycolate, di(n-butyl) thiodiglycolate, glycol-di-3-mercaptopropionate, 1,6-hexanedithiol, ethylene glycol bis(2-mercaptoacetate) and tetra(ethylene glycol) dithiol.

* * * * *